United States Patent [19]

Gordon

[11] Patent Number: 5,745,840
[45] Date of Patent: Apr. 28, 1998

[54] EQUALIZATION IN A SIMULCAST COMMUNICATION SYSTEM

[75] Inventor: Stuart Hugh Gordon, Christchurch, New Zealand

[73] Assignee: Tait Electronics Limited, New Zealand

[21] Appl. No.: 574,468

[22] Filed: Dec. 8, 1995

Related U.S. Application Data

[63] Continuation of Ser. No. 216,672, Mar. 22, 1994, abandoned.

[51] Int. Cl.$^6$ ................................................ H04B 7/005
[52] U.S. Cl. .................... 455/51.2; 455/56.1; 455/67.4; 455/67.6
[58] Field of Search ........................ 455/51.2, 53.1, 455/54.1, 56.1, 63, 67.1, 67.4, 67.6, 226.1; 375/356, 358

[56] References Cited

U.S. PATENT DOCUMENTS

| | | |
|---|---|---|
| 1,711,560 | 5/1929 | Espenschied et al. . |
| 2,033,271 | 3/1936 | Aiken . |
| 2,094,113 | 9/1937 | Affel . |
| 4,047,009 | 9/1977 | Challen . |
| 4,223,405 | 9/1980 | Hattori et al. . |
| 4,255,814 | 3/1981 | Osborn . |
| 4,301,539 | 11/1981 | Kage . |
| 4,317,220 | 2/1982 | Martin . |
| 4,475,246 | 10/1984 | Batlivala et al. . |
| 4,516,269 | 5/1985 | Krinock . |
| 4,570,265 | 2/1986 | Thro . |
| 4,696,052 | 9/1987 | Breeden . |
| 4,718,109 | 1/1988 | Breeden et al. . |
| 4,850,032 | 7/1989 | Freeburg . |
| 5,014,344 | 5/1991 | Goldberg . |
| 5,046,128 | 9/1991 | Bennett . |
| 5,054,113 | 10/1991 | Jasinski ........................ 455/51.2 |
| 5,060,240 | 10/1991 | Erickson et al. . |
| 5,077,759 | 12/1991 | Nakahara ........................ 455/53.1 |
| 5,127,101 | 6/1992 | Rose, Jr. . |
| 5,361,398 | 11/1994 | Christian et al. ................ 455/51.2 |

FOREIGN PATENT DOCUMENTS 61-107826  5/1986  Japan .

OTHER PUBLICATIONS

Jerome V. Krinock, "Automatic Equalization for Simulasting" May 23, 1982.
A. Wouk, "A Course of Applied Functional Analysis", p. 238, J. Wiley, New York, 1979.
G.D. Gray, "The Simulasting Technique: An Approach to Total-Area Radio Coverage," *IEEE Tr. Veh. Tech.*, V. 28 p. 117, May 1979.
M.S. Corrington, "Frequency Modulation Distortion Caused by Common-and-Adjacent-Channel Interference", *RCA Rev.*, V. 7, p. 522, Dec. 1946.
S. Thro, "System Configurations for Wide Area Trunking", *Mobile Times*, p. 22, Jul. 1981.
M. Henze, J.D. Parsons, P.A. Ratliff, M.J. Withers, "Diversity Techniques for Mobile Radio Receeption", *IEEE Tr. Veh. Tech.*, V. 24, p. 75 Aug. 1976.
D.T.L. Lee, et al., "Recursive Least Squares Ladder Estimation Algorithms", *IEEE Tr. Acous., Speech Sign. Proc.*, V. 29, p. 627, Jun. 1981.

(List continued on next page.)

*Primary Examiner*—Reinhard J. Eisenzopf
*Assistant Examiner*—Thanh Le
*Attorney, Agent, or Firm*—Knobbe, Martens Olson & Bear, LLP

[57] ABSTRACT

A simulcast system for transmitting and receiving signals through a plurality of remote sites within a certain area is generally described. The system automatically equalizes signal characteristics in transmission overlap regions between adjacent sites so that mobile units within the area receive signals of acceptable quality. A particular site is chosen to provide reference characteristics and a series of consecutively adjacent sites are then equalized in pairs. A control site sequentially transmits and receives a training signal through each site to determine an adjustment which will equalize the signal characteristics of successive sites in the series.

8 Claims, 5 Drawing Sheets

OTHER PUBLICATIONS

D.S. Dewire, "Prec. Carrier Freq. Cont. & Mod. Phase Equal. of Base Trans. in a Mobile Radio System", *IEEE Tr. Veh. Comm.*, V. 9, p. 54, May 1960.

H.L. Van Trees, *Detection, Estimation and Modulation Theory*, p. 59 J. Wiley, New York, 1968, Eq. (146).

R.E. Langseth, "Some Effects of Delay and Mod.–Index Mismatch on Cochannel FM Interference", *IEEE Tr. Veh. Tech.*, V. 20, p. 124, Nov. 1971.

C.M.Rader, "Fourea — A Short Demonstration ofthe FFT", *IEEE Press*, New York, 1979.

A.V. Openheim, R.W. Schafer, "Digital Signal Processing", Prentice–Hall, Englewod Cliffs, NJ, 1975.

A.P. Clark, "Signal Distortion", Advanced Data Transmissions Systems, pp. 46–73 J. Wiley, New York, 1977.

R.B. Blake, et al. "Voice–Frequency Tansmission for Special–Service Telephone Circuits", Bell Systems Technology Journal, V. 60, p. 1585, Sep. 1981.

American Microsystems, Inc., "S2811 Signal Processing Peripheral Advanced Product Description", Santa Clara, CA, Sep. 1981.

S.C. Tanaka, R.R. Buss, G.P. Weckler, "The Tapped Analog Delay", *IEEE Tr. Parts, Hybrids Packaging*, V. 12, Jun. 1976.

R.W. Lucky, H.R. Rudin, "Generalized Automatic Equalization for Communication Channels", *Proc. IEEE* V. 54, p. 439, Mar. 1966.

E.R. Ferrara, "Fast Implementation of LMS Adaptive Filters", *IEEE Tr. Acous., Speech Sig. Proc.*, V. 28, p. 474, Aug. 1980.

B. Widrow, et al., "Stationary and Nonstatioinary Learning Characteristics of the LMS Adaptive Filter", *Proc. IEEE*, V. 62, p. 1151, Apr. 1975, Section II–IV.

M. Destino, J. McCool, B. Widrow, "Adaptive Filtering in the Frequency Domain", *Proc. IEEE*, V. 66, p. 1658, Dec. 1978.

EQUALIZATION IN A SIMULCAST COMMUNICATION SYSTEM

This application is a continuation of U.S. patent application No. 08/216,672, filed Mar. 22, 1994 now abandoned.

FIELD OF THE INVENTION

This invention relates to a simulcast communication system in which audio or other signals are transmitted between a control site, remote base sites and mobile units. Particularly a system having automatic equalization of signal characteristics in transmission overlap regions between adjacent base sites.

BACKGROUND OF THE INVENTION

Simulcast communication systems involving multiple sites transmitting the same information on the same carrier frequency are generally well known. Taxi, courier and utility services use systems of this kind. Multiple sites are required because the range of a single transmitter is typically limited by geographical features and restrictions on tower height or transmission power. Mobile units must be able to receive signals anywhere within a desired coverage area and this necessarily requires a network of sites with overlapping transmission regions.

A fundamental problem which arises with simulcast systems, particularly FM systems, is interference between signals from adjacent sites. Transmission overlap regions are created where signal strengths differ by less than a certain threshold, typically ±8 dB. A receiver unit in such an overlap region will attempt to demodulate a signal derived from two or more similarly strong sources and a distorted output will result unless the transmission characteristics of adjacent sites are carefully matched. Experience shows that in an FM system at least, amplitude should be matched to within ±1 dB, absolute delay to ±10 μs, and group delay to ±10 μs for acceptable output. Carrier frequencies should be matched to within about 15 Hz.

Differences arise between the characteristics of adjacent sites for various reasons and an initial alignment is easily lost. Signals are normally produced or processed at a control site and transmitted to all the remote base sites in a system over landline, microwave or radio links. Each site and link is subject to variable weather and ageing effects, while a link which is part of some other communication service may be re-routed without warning. Equalization of the signal transmission characteristics between base sites in a simulcast system should therefore be an ongoing process.

A typical simulcast system might have 10 or more base sites each with a transmission region of around 10 km². A test or training signal is transmitted from a control site to each base site to determine transmission characteristics at predetermined intervals when the system is quiet. Respective equalisation devices, usually in the form of programmable filters, are then adjusted appropriately with each test and adjustment usually taking a minute or less. In some system areas equalization must be carried out almost daily while at others an interval of a month or more may be satisfactory. Ideally each system is capable of fully independent operation and require no initial equalisation.

Several known systems involve automatic equalization of signal characteristics. U.S. Pat. No. 4,516,269 (Krinock) describes a system in which the base sites are each compared directly with a particular site which provides reference characteristics. As most of the sites will not be adjacent to the reference site and their transmission regions will not overlap, very much of the process is unnecessary. U.S. Pat. No. 5,127,101 (Rose) describes a system in which the base sites are equalized to a set of absolute reference characteristics and a manual set-up process is required. U.S. Pat. No. 5,014,344 (Goldberg) describes a system in which adjacent base sites are grouped together and adjacent groups are equalized to provide a uniform propagation delay. Signal characteristics between specific adjacent sites are generally not adjusted for acceptable signal quality.

SUMMARY OF THE INVENTION

It is an object of the present invention to provide for a simulcast system in which the transmissions from a series of consecutively adjacent base sites are automatically equalized.

Accordingly the invention may broadly be said to consist in a system in which the control site transmits and receives a training signal through a selected base site to determine reference characteristics. The training signal is then sent through a second base site adjacent to the first selected site to determine test characteristics. An adjustment is then made so that signals passing through the second base site match those of the first base site when both are received in a transmission overlap region between the sites. A comparison is then made between the second base site and a third base site adjacent to the second base site and adjustment of the third base site proceeds in a similar manner. These steps are repeated until all the base sites in a predetermined series have been sequentially adjusted. Each base site is thereby equalized with one of its neighbours and ultimately with reference to the first selected site.

BRIEF DESCRIPTION OF THE DRAWINGS

A preferred embodiment of the invention will be described with reference to the accompanying drawings of which.

DETAILED DESCRIPTION OF A PREFERRED EMBODIMENT OF THE INVENTION

Figure 1:
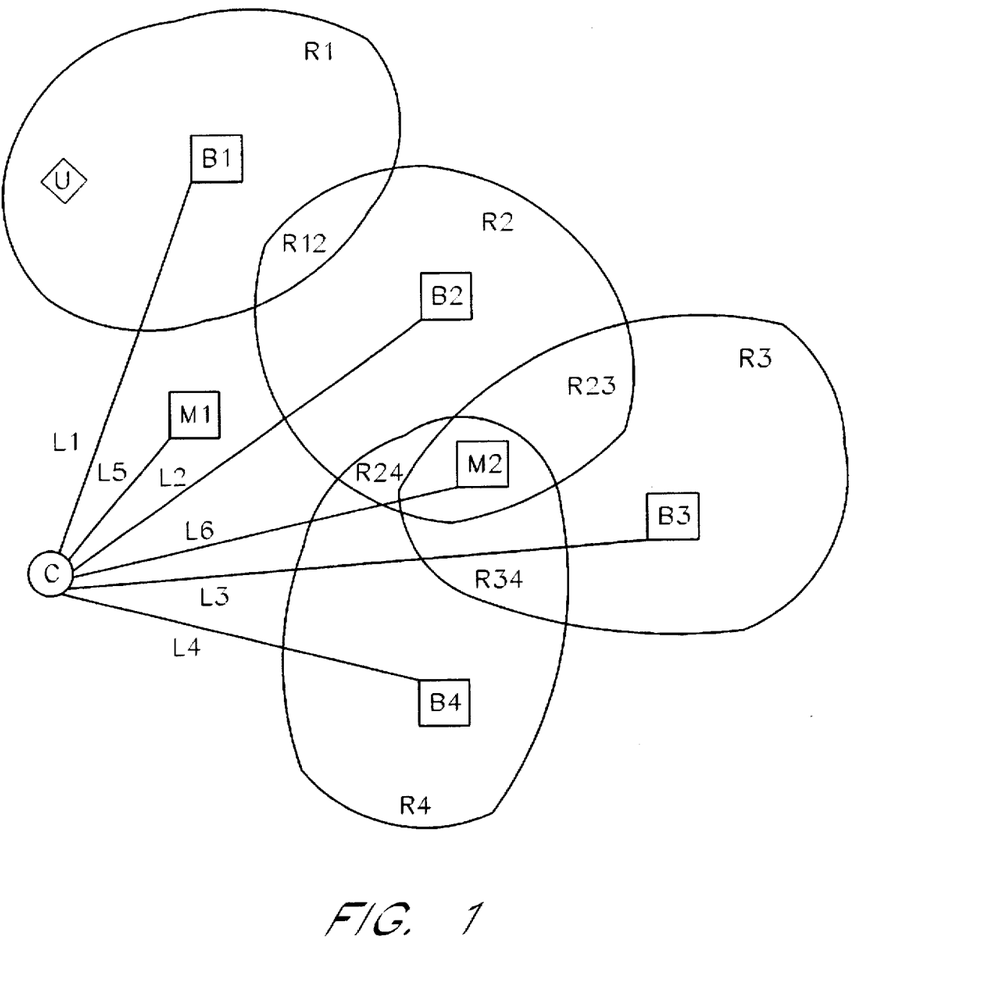
FIG. 1 schematically shows the transmission regions of a small number of base sites in a simulcast system.

FIG. 1 indicates a typical layout of a small number of base sites and their transmission regions in a simulcast communication system. Four base sites B1–B4 are positioned at appropriate points within a desired coverage area, such as on building or hill tops. Signals transmitted from the sites can be received by mobile units in respective transmission regions R1–R4. Transmission overlap regions where similar signal strengths are received from adjacent sites are indicated as R12, R23, R24 and R34.

Each base site is connected to a common control site C by a respective transmission link L1–L4 such as a telephone line with a city, or microwave path in a rural area. The control site itself may also function as a base site. Monitor sites M1, M2 are positioned to receive signals from a number of pairs of base sites, although they need not be placed in the overlap regions themselves. A single monitor could receive weak signals from every base site in some systems. M1 lies close to region R12 while M2 lies within each of R23, R24 and R34. Each monitor site is connected to the control site through a respective transmission link L5, L6.

Ideally a mobile unit U moving within the coverage area should be able to communicate with other units unaware of the existence of various transmission regions in the system. In practice there will always be some interference between the signals of adjacent sites in the overlap regions, especially in FM transmission systems, but with careful matching of signal characteristics between adjacent base sites undesirable effects can be minimised. It will be appreciated that signal characteristics can not be matched exactly everywhere in an overlap region but only to within certain limits at a chosen point or points.

In an equalization process according to the present invention, site B1 might be chosen as a reference for which signal characteristics in overlap region R12 are determined through monitor M1. Test signal characteristics for site B2 are then determined through the same monitor and an adjustment made at the control site C itself so that the test signal characteristics substantially match the reference characteristics. Site B2 then becomes a reference for adjustment of transmission through site B3 and their signal characteristics are thereby equalized in region R23 through monitor M2. Site B3 then becomes a reference for site B4 again through monitor M2. Sites B2 and B4 would not be compared directly.

The process thereby equalizes signal characteristics between a series of consecutively adjacent base sites in a simulcast system so that characteristics in specific overlap regions are relatively matched, rather than adjusted with respect to a set of absolute reference characteristics. A particular system may well undergo separate equalization processes for several distinct series of base sites. Certain base sites may also occasionally breakout of the system and function independently without equalisation. As will be explained, it has been found that large parts of the equalization process are readily implemented in software which runs essentially automatically during quiet periods of normal system operation.

Figure 2:
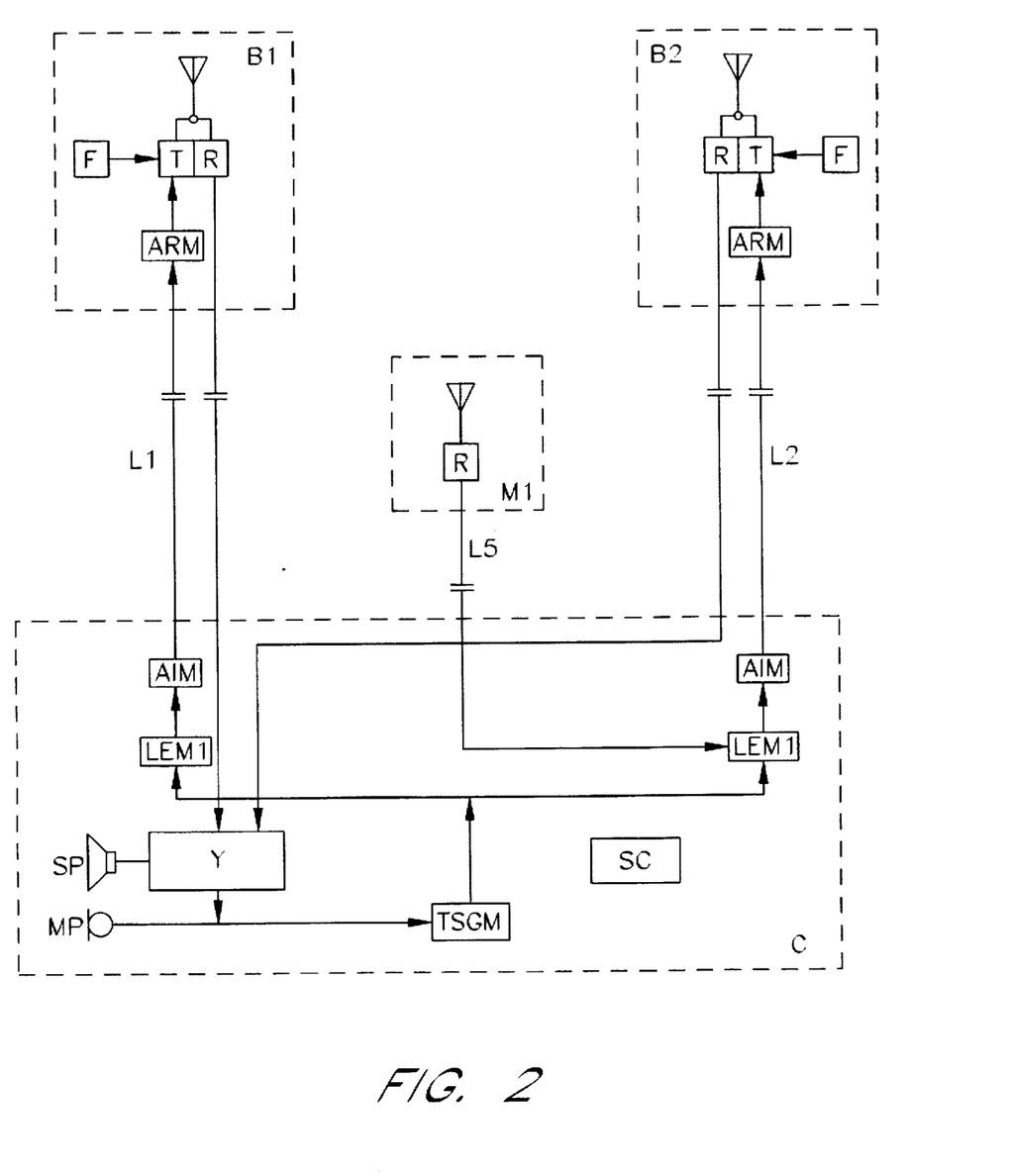
FIG. 2 shows the primary components of two adjacent base sites, a monitor site and a control site.

FIG. 2 shows the primary components of two adjacent base sites B1, B2, their monitor site M1 and the control site C. Each base site includes a transmitter T and receiver R which make use of a common aerial. Each also includes a high stability frequency reference source F, typically 10 MHz, to minimise any difference between carrier signals in the transmission overlap region. Monitor site M1 also includes a receiver and is positioned in a known configuration with sites B1 and B2. This enables equalisation to be calculated for a particular point in the transmission overlap region of each pair of adjacent base sites. Usually at their point of maximum overlapping signal strengths. Each site is connected to the control site through a respective transmission link L1, L2, L5, typically a leased telephone line or microwave path.

The control site includes a voter V which processes signals received from various base sites. In a system such as used in a taxi service, the voter selects and presents incoming audio signals to an operator through a speaker SP, who may over-talk through microphone MP, for dispatch to the base sites. A signal to be transmitted by the base sites throughout the coverage area of the system passes through training signal generator module TSGM to respective line equalization modules LEM and audio inversion modules AIM whose function will be explained shortly. Transmission links L1 and L2 carry the signal to respective audio recovery modules ARM at the base sites and respective transmitters T. Some essentially standard items such as line barrier units and other interfaces have been omitted for clarity. The audio inversion and recovery modules may be optional in some systems, such as those allowing manual equalization which will not be described here. A system controller SC, typically a personal computer, is connected to each LEM and the TSGM although for clarity the connections have been omitted.

The training signal generator module TSGM provides an input path common to the entire simulcast system. During an equalisation process it excludes operator or voter input and generates a training signal which is transmitted sequentially to each base site in a predetermined series. The signal is typically a combination of tones in a range of frequencies (typically 45 Hz–2550 Hz), accompanied by a keytone (typically 2970 Hz) to control transmitter keying. The tones have closely spaced frequencies (typically 45 Hz apart) and equal amplitudes. The TSGM may also generate a continuous tone-controlled squelch signal CTCSS which is used in some systems to distinguish independent groups of mobile unit users (typically 67–250 Hz).

The line equalisation modules LEM perform two important functions. Firstly in sampling and characterizing training signals received from the base sites through the monitor sites, such as on link L5. Secondly in calculating an appropriate equalization transformation according to the sampling results and applying this to signals being transmitted to the base sites, such as on links L1, L2. Hardware appropriate to carry out functions of this kind may employ a programmable finite impulse response filter as generally known. Amplitude, absolute delay and group delay adjustments may be made simultaneously by an appropriate calculation of filter coefficients. The modules may also be disabled to prevent transmission through idling base sites during an equalisation process.

As each training signal is sent from the TSGM for transmission to a particular base site a start pulse is also sent directly to the corresponding LEM. This triggers a timer in the LEM which is then able to measure an offset between transmission of the training signal and the timing of a sampling sequence applied to the signal on return from the base site. Sampling of the return training signal takes place at predetermined intervals which are generally offset from the leading portion of the signal. A correction to the apparent overall delay in transmission of this training signal can thereby be made in softward, rather than by distributing a high speed clock signal for example.

The audio inversion and recovery modules AIM, ARM also perform two main functions. Firstly each AIM translates a combined speech signal and CTCSS from an LEM to fit the pass band determined by the transmission link to its corresponding base site. The frequency inversion which takes place also provides immunity to inadvertent phase inversion during routine maintenance. The ARM restores the original signal from the LEM and keys the corresponding transmitter T on the base site. Secondly the modules in conjunction with the TSGM may carry out bulk scaling prior to equalisation as a coarse compensation for signal losses over a transmission link. The TSGM sends a scaling signal to each base site before the training signal. The scaling signal is typically a combination of equal amplitude audio tones similar to the training signal but preceded by a different keytone (typically 2900 Hz). The keytone triggers the ARM of the base site being equalized, which sets an audio gain level based on the received strength of the scaling signal.

Finally in FIG. 2, the system controller SC which initiates and controls equalisation, and monitors performance of the simulcast system overall. The controller provides a user friendly interface for the system operator in addition to a console which would normally be provided in conjunction with the speaker SP and microphone MP. The controller is programmed to initiate an equalisation process through the TSGM at intervals appropriate to the nature of the system area during quiet periods. An initial manual equalisation is not required following installation of a new system. The filter transformation coefficients calculated by each LEM are stored in the controller as a record of transmission characteristics over a period of time.

Figure 3:
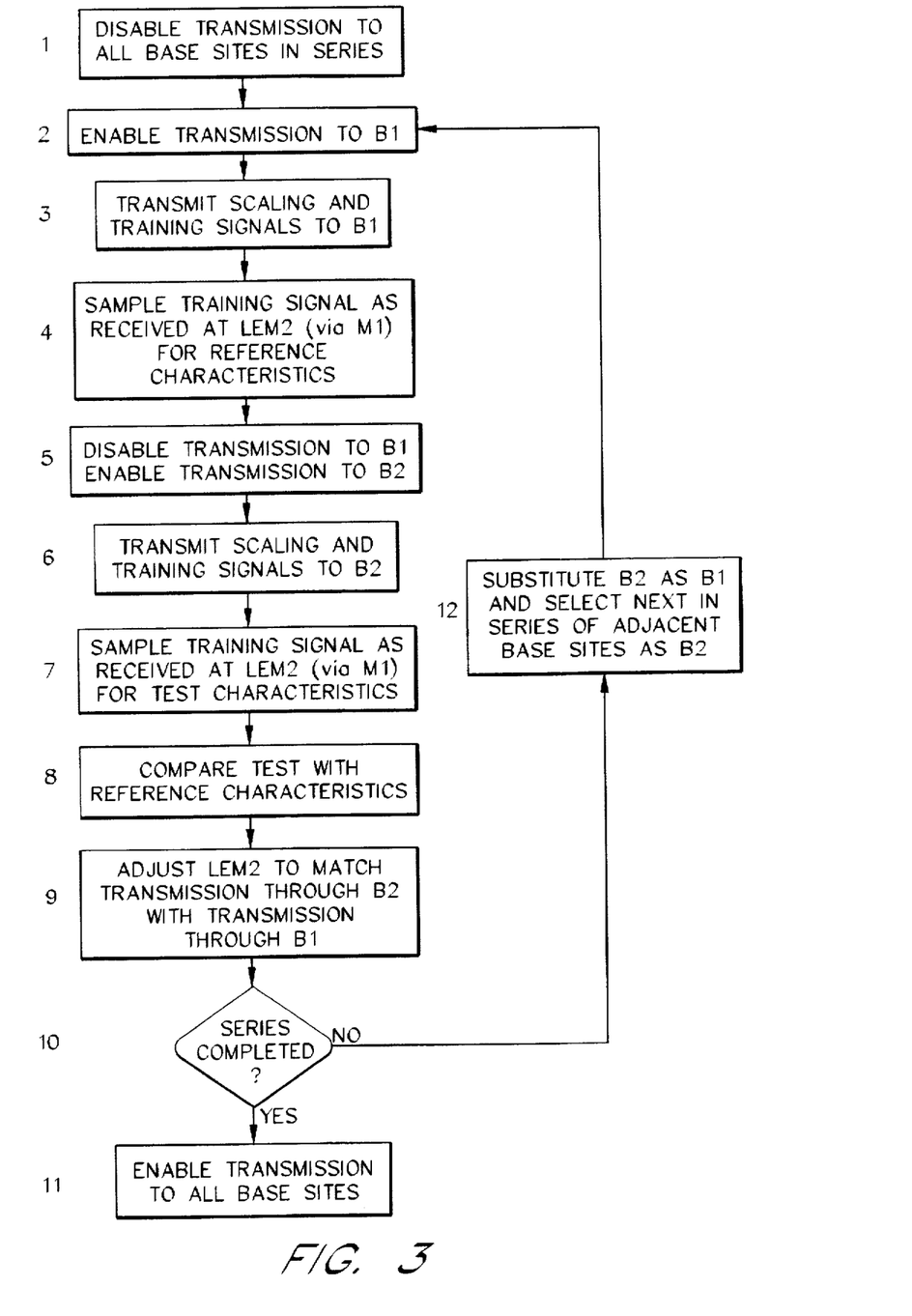
FIG. 3 is a flow chart indicating the equalization process in general terms.

FIG. 3 shows a sequence of steps initiated by the system controller to equalise a series of adjacent base sites such as shown in FIG. 1. In step 1 the controller disables the transmission path to every base site in the series. In steps 2 and 5 individual paths are enabled/disabled as transmission characteristics of consecutive sites in the series are adjusted. In step 3 the TSGM transmits scaling and training signals to site B1 as described in relation to FIG. 2. The ARM at site B1 undergoes bulk scaling. LEM1 assumes a standard setting and transmission through site B1 provides a reference for the entire series. In step 4 the training signal transmitted through site B1 is received via monitor site M1 and is sampled at LEM2. Using information from the controller on the position of sites B1, B2 and M1, LEM2 is able to calculate reference characteristics for a signal from B1 as it would appear at a chosen point in the transmission overlap region between B1 and B2.

In step 6 the scaling and training signals are sent to site B2 and bulk scaling takes place in the ARM at B2. In step 7 the training signal is transmitted through site B2 and received via site M1 to be sampled at LEM2. Again using information from the controller, LEM2 is able to calculate test characteristics of a signal as it would appear from B2 at the chosen point in the transmission overlap region between B1 and B2. In step 8 LEM2 compares the reference and test characteristics and calculates an adjustment of LEM2 to create a match in amplitude, absolute delay and group delay of the signals from B1 and B2. In step 9 the coefficients of a FIR filter in LEM2 are adjusted to equalise the characteristics of a signal received by a mobile unit in the overlap region between B1 and B2.

If the equalisation process has reached the end of the series, such as transmission through site B4 having been adjusted in FIG. 1, then transmission to every base site is enable in step 11 and the simulcast system resumes normal operation. If other sites in the series remain to be equalised the controller proceeds in step 12, for example using transmission of the training signal through site B2 to provide reference characteristics for transmission through site B3, and so on. Note that the scaling signal should only be sent once to each base site so step 3 is not repeated in its entirety when an adjusted site is used to provide reference characteristics for a consecutive adjacent site.

Figure 4:
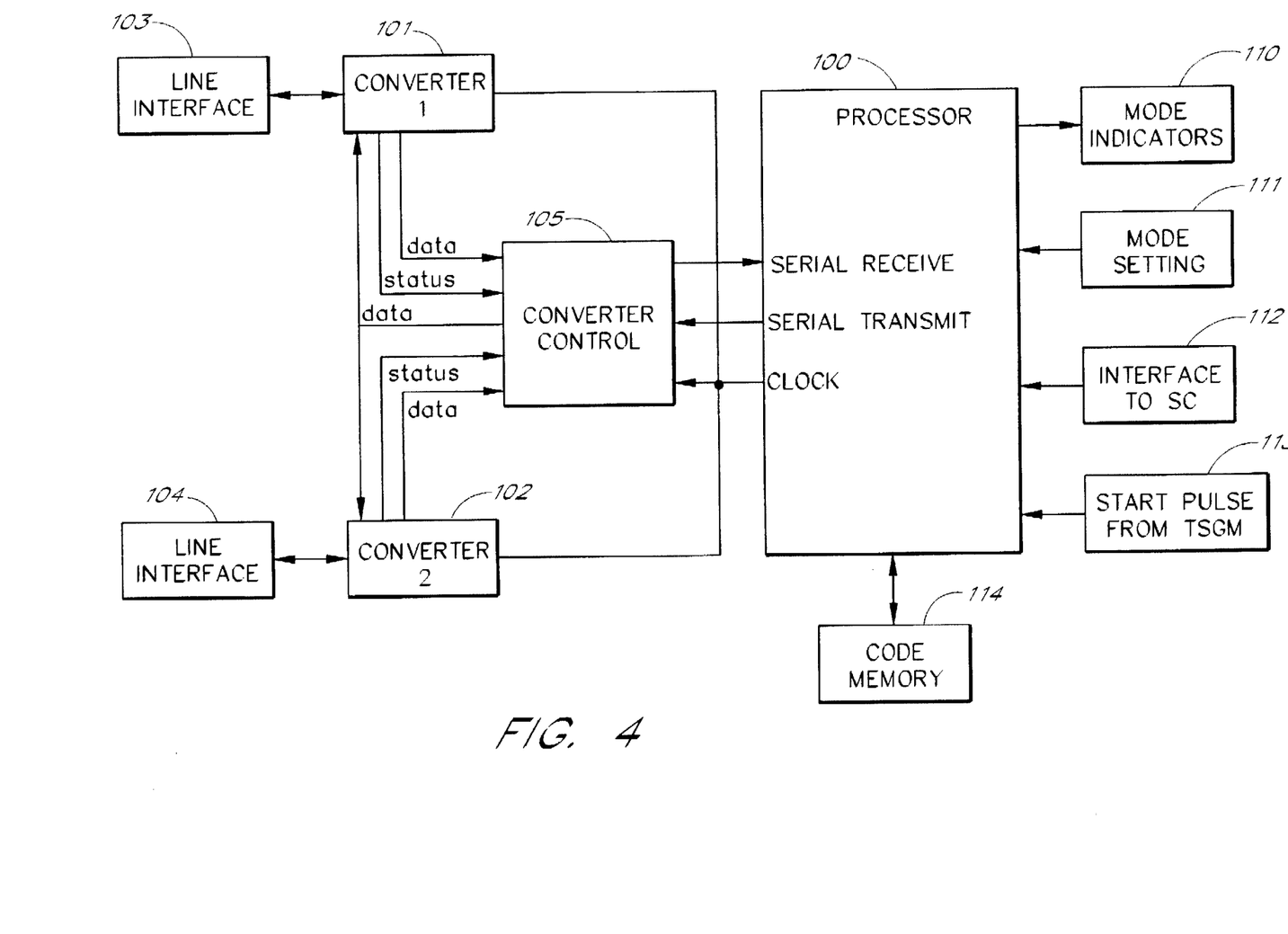
FIG. 4 is a block diagram of a signal processor card used in a software driven system according to the invention.

FIG. 4 provides an indication of the layout of general purpose processor cards which may be used to construct the various modules used in a simulcast system according to the invention. It will be appreciated that digital signal processing allows many routines used in an equalisation process to be implemented entirely in software. Each card has a process 100 (typically a Texas Instruments TLC 32044) and one or more analog-digital/digital-analog convertors 101, 102 with corresponding line interfaces 103, 104. The processor shown has only a single port for receiving/transmitting data from the convertors so a convertor control component or multiplexer 105 is therefore required for controlled communication. In a TGSM the convertors would receive audio and sub-audio CTCSS signals respectively and output corresponding signals to the LEMs. In an LEM the convertors would receive signals from the TGSM and from an appropriate monitor site for sampling the training signal. In an LEM the convertors would also output signals for transmission to corresponding base sites after adjustment for equalisation of the reference and test characteristics determined between adjacent sites. In other modules only a portion of the convertor capability might be used.

A detailed mode of operation of each card is determined by a set of dip switches 110 and indicated by LEDs 111. The module in which this card is used may receive signals from the system controller SC through port 112 if necessary, and if the module is a LEM may receive start pulses from the TSGM through port 113. Software used by the processor is stored in EPROM 114. The processor provides a clock signal for the convertors and convertor control, typically of 10 MHz.

Figure 5:
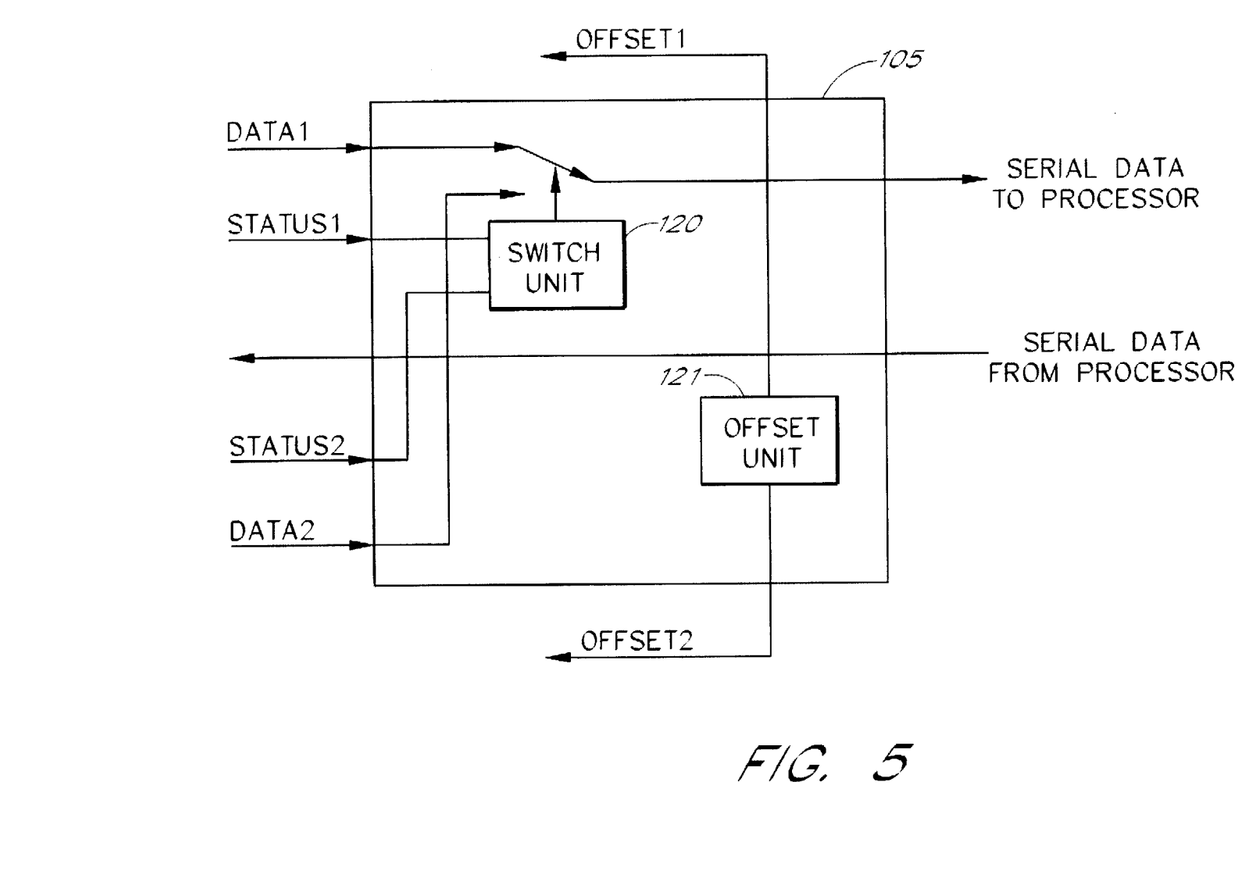
FIG. 5 is a detailed circuitry of a converter control component in FIG. 4.

FIG. 5 shows a detail circuitry of the converter control component or multiplexer 105 which comprises a switch unit 120 and an offset unit 121.

While this description constitutes a preferred embodiment of the present invention it will be appreciated that the invention is susceptible to modification, variation and change without departing from the proper scope or fair meaning of the accompanying claims.

I claim:

1. In a simulcast communication system having a control site, a plurality of base sites and at least one monitor site, a method of equalizing signal characteristics in transmission overlap regions between a series of adjacent base sites, comprising:
   (a) transmitting a training signal from the control site to a first base site in the series, the first base site being associated with a first signal sampling means and a first signal equalizing means, from the first base site to a monitor site, and from the monitor site to a second signal sampling means associated with a second base site, to determine reference signal characteristics;
   (b) transmitting the training signal from the control site to the second base site, from the second base site to the monitor site, and from the monitor site to the second sampling means associated with the second base site, to determine test signal characteristics;
   (c) comparing the test signal characteristics with the reference signal characteristics and adjusting a signal equalizing means associated with the second case site to compensate for deviation of the test characteristics from the reference characteristics; and
   (d) repeating steps (a), (b) and (c) generally using the second base site in step (b) as the first base site in a subsequent step (a) and using a third base site adjacent to the second base site in step (b) as the second base site in a subsequent step (b), each such third base site having associated third signal sampling means and third signal equalizing means, until signal characteristics have been substantially equalized in the transmission overlap regions between each pair of consecutive adjacent base sites in the series.

2. A method according to claim 1, wherein the sampling means and equalizing means associated with each base site are provided together as a respective module at the control site.

3. A method according to claim 1, wherein the signal characteristics comprise amplitude, absolute delay and group delay and are adjusted simultaneously in each signal equalizing means by a FIR digital filter.

4. A method according to claim 2, wherein the respective module dedicated to a particular base site carries out the comparison between reference and test signal characteristics for that base site.

5. A simulcast communication system having a control site, a plurality of base sites connected to the control site by respective base transmission links, and apparatus for equalizing signal characteristics in transmission overlap regions between a series of adjacent base sites, comprising:

training signal means at the control site for transmitting a training signal to any base site in the series over a respective base transmission link;

at least one monitor site connected to the control site by a respective monitor transmission link for transmitting the training signal back to the control site when received from a base site;

a plurality of signal sampling means dedicated to respective base sites for sampling the training signal when received and transmitted to the control site by the monitor site;

a plurality of signal equalizing means dedicated to respective base sites for adjusting signal transmission characteristics in respective base transmission links in response to output from respective dedicated signal sampling means; and system control means which activates the training signal means for transmitting the training signal consecutively through each base site in the series to the at least one monitor site and back to the control site, to enable comparison of signal characteristics between adjacent base sites considered in pairs;

activates the respective signal sampling means dedicated to each base site in the series for determining reference characteristics from the training signals when transmitted though a first base site in each pair, and for determining test characteristics for the training signal when transmitted through the second base site in each pair; and activates the respective signal equalization means dedicated to each base site in the series, for adjusting signal characteristics of the respective base transmission links to compensate for deviation of the respective test characteristics from the respective reference characteristics.

6. A system according to claim 5, wherein the respective sampling means and equalizing means dedicated to each base site are provided together in a respective module at the control site.

7. A system according to claim 5, wherein the signal characteristics comprise amplitude, absolute delay and group delay and are adjusted simultaneously by a FIR digital filter in each signal equalizing means.

8. A method according to claim 6, wherein the respective module dedicated to a particular base site carries out the comparison between reference and test signal characteristics for that base site.

* * * * *